United States Patent [19]
Nubson

[11] 3,983,893
[45] Oct. 5, 1976

[54] FLOW DIVIDER VALVE ASSEMBLY

[75] Inventor: Richard C. Nubson, Minnetonka, Minn.

[73] Assignee: Eaton Corporation, Cleveland, Ohio

[22] Filed: June 20, 1975

[21] Appl. No.: 588,739

[52] U.S. Cl. .................................. 137/101; 60/422
[51] Int. Cl.² ........................................ G05D 11/03
[58] Field of Search ..................... 137/101; 60/422

[56] References Cited
UNITED STATES PATENTS

| | | | |
|---|---|---|---|
| 3,421,532 | 1/1969 | Davidson | 137/101 |
| 3,916,932 | 11/1975 | Thorsen | 137/101 |

*Primary Examiner*—Robert G. Nilson
*Attorney, Agent, or Firm*—Teagno & Toddy

[57] ABSTRACT

A flow divider valve assembly is provided which divides a flow of fluid between a priority flow device, such as a power steering system, and an excess flow device, such as an auxiliary mechanism. A valve spool is axially movable within the main valve bore and defines an axial bore having one end in fluid communication with the priority flow outlet port. The valve spool is movable within the main bore in response to variations in the pressure differential between the outlet ports. A first aperture communicates between the inlet port and the axial bore and the valve spool defines a spool land defining a second aperture communicating between the inlet port and the axial bore. The main valve bore defines a sealing surface disposed fluidicly between the inlet port and the excess flow outlet port, and when the power steering system is not being operated, and there is a low pressure at the priority flow outlet port, the valve spool is shifted so that the sealing surface prevents fluid flow from the inlet port through the second aperture. Thus, the only flow to the priority flow outlet port is from the inlet port through the first aperture and through the axial bore. The remainder of the flow is, preferably, from the inlet port through the main valve bore, past a pair of flats on the spool land, and to the excess flow outlet port.

10 Claims, 4 Drawing Figures

TO AUXILIARY MECHANISM

TO POWER STEERING SYSTEM

FLOW DIVIDER VALVE ASSEMBLY

BACKGROUND OF THE DISCLOSURE

The present invention relates to a flow divider valve assembly, and more particularly, to one in which the modulating piston is of the center-flow type.

There are many known valve assemblies which are utilized to divide a flow of fluid between a priority flow utilization device, such as a power steering system, and an excess flow utilization device, such as the hydraulic motor of an auxiliary mechanism associated with a vehicle. One of these known flow divider valve assemblies includes a piston or valve spool having an axially extending internal chamber which is connected with an inlet passage by an orifice or aperture in the wall of the valve spool. The central chamber is open at one end of the valve spool to enable fluid to flow from the chamber to a priority flow outlet passage.

During operation of the power steering system, the open end of the chamber is unrestricted so that fluid can flow freely from the chamber to a priority flow outlet. At this time, the rate of fluid flow is determined by only the size of the orifice in the wall of the valve spool. When the auxiliary mechanism is active, the valve spool is shifted to move the open end of the chamber in the valve spool into a telescopic relationship with a projection on a modulating plug and the resulting orifice defined by the end of the spool and the projection on the plug modulates or restricts flow to the priority flow outlet.

Although flow divider valves constructed as described above have been generally satisfactory in operation, the production costs have been relatively high as a result of the extremely small clearance required between the external surface of the projection on the modulating plug and the internal surface of the valve spool. In addition, the use of the telescoping modulated plug has made it impractical to reduce the control flow to the priority port (i.e., the low flow rate when the priority device is not in operation), to a desirably low level, because of the fear of the modulating plug jamming within the valve spool, which would prevent subsequent flow to the priority device, even upon demand.

This inability to further reduce the controlled flow necessitated a larger pump output than was actually utilized, with the remainder being wasted. For example, if the priority flow to the steering system were 25 gpm and the controlled flow could be reduced only to about 7 gpm, and assuming further a requirement by the auxiliary mechanism of about 28 gpm, it may be seen that the pump must be capable of an output of at least 35 gpm (28 + 7) even though neither the steering nor auxiliary mechanism ever requires more than 28 gpm (this type of valve is used in a system in which the priority device and the auxiliary mechanism never simultaneously require a full flow). Therefore, about 20% of the pump output represents wasted pump capacity and energy, necessitated by the inability of prior art flow dividers to minimize or eliminate the controlled flow to the priority device during operation of the auxiliary mechanism.

SUMMARY OF THE INVENTION

Accordingly, it is an object of the present invention to provide an improved flow divider valve assembly which is simpler and more economical to construct and which is more reliable in operation, especially during operation of the auxiliary mechanism.

It is another object of the present invention to provide a flow divider valve of the type in which it is possible to reduce the controlled flow to the priority port to a lower level than has been possible previously, and if desirable, to reduce the controlled flow to zero.

It is a related object of the present invention to provide a flow divider valve assembly with which the priority device may be a closed-centered valve or a closed-center steering system.

It is also an object of the present invention to provide a flow divider valve assembly having a configuration which permits the valve and the modulating spool to be substantially shorter than in prior art flow divider valves.

The above and other objects of the present invention, which will become apparent upon a reading of the following detailed description, are accomplished by the provision of an improved flow divider valve assembly comprising a valve body which defines an inlet port connected to a source of fluid under pressure, a priority flow outlet port, an excess flow outlet port and a main valve bore interconnecting the ports. A valve spool is movable within the valve bore between a first condition restricting flow to the excess flow outlet port and a second condition restricting flow to the priority flow outlet port. A first aperture means is defined by the valve spool and ports fluid flow from the inlet port to the priority flow outlet port when the valve spool is in either the first or second condition. A second aperture means is defined by the valve spool, axially disposed from the first aperture means, and ports fluid flow from the inlet port to the priority flow outlet port when the valve spool is in the first condition. The main valve bore defines a sealing surface disposed fluidicly between the inlet port and the excess flow outlet port, the sealing surface preventing fluid communication between the inlet port and the second aperture means when the valve spool is in the second condition. The valve spool is movable between the first and second conditions in response to the fluid pressure differential between the priority flow outlet port and the excess flow outlet port.

DESCRIPTION OF THE PREFERRED EMBODIMENT

Figure 1:
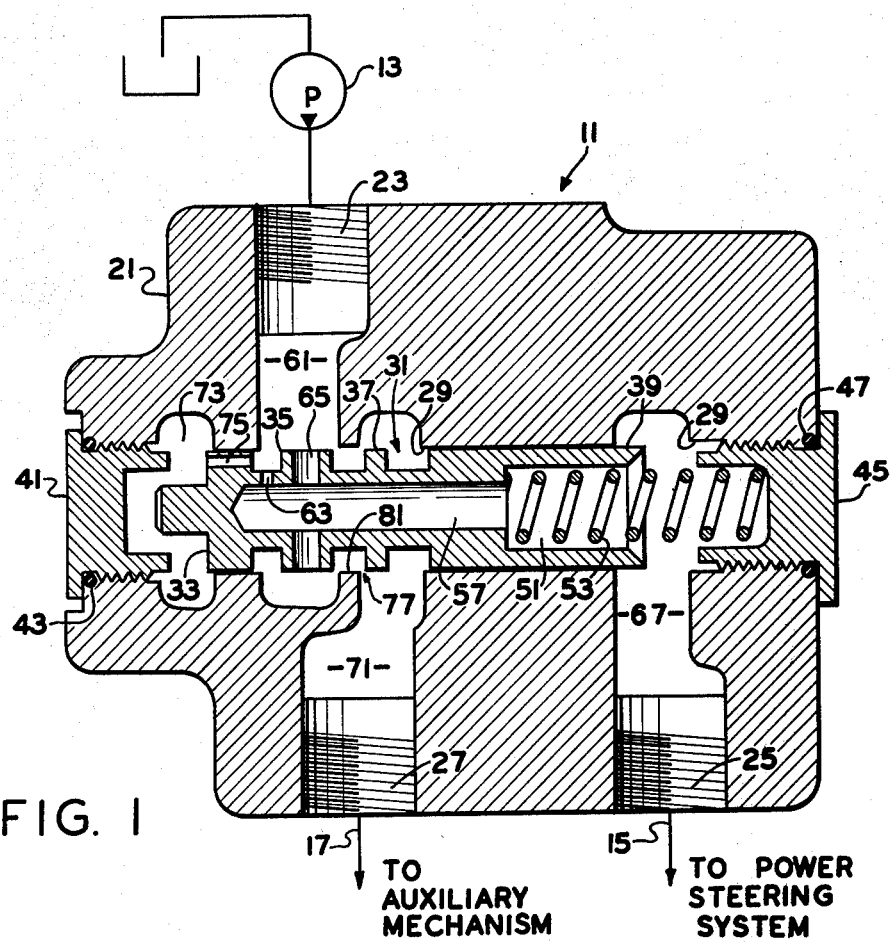
FIG. 1 is a somewhat diagrammatic illustration of a system including a cross-section view of a flow divider valve made in accordance with the present invention.

Referring now to the drawings, which are for the purpose of illustrating a preferred embodiment of the invention, and not for limiting the same, FIG. 1 illustrates a system in which a flow divider valve 11 is operable to divide a fluid flow from a pump 13 between a conduit 15 leading to a power steering system, and a conduit 17 leading to an auxiliary mechanism such as a fluid motor or cylinder. When the power steering system is being operated, fluid from the pump 13 is directed to the power steering system at a predetermined flow rate which is maintained substantially constant. The fluid entering the valve 11 which is in excess of the predetermined flow rate to the power steering system is directed to the auxiliary mechanism. Whenever the auxiliary mechanism is in an active condition, a predetermined minimum flow rate is provided to the power steering system and a predetermined maximum flow rate is provided to the auxiliary mechanism, again, with each of the flow rates being maintained substantially constant.

Figure 2:
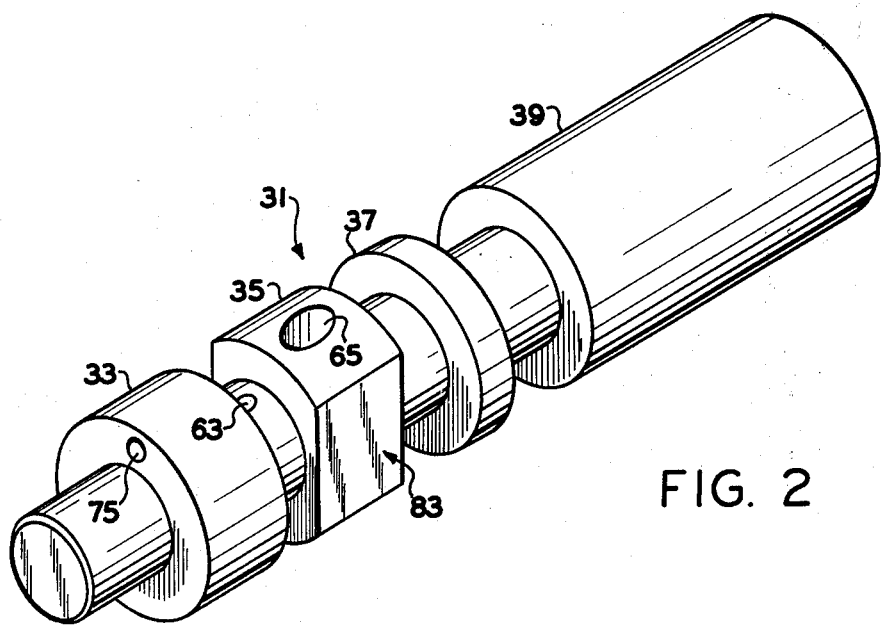
FIG. 2 is an enlarged perspective of the valve spool utilized with the flow divider valve of the present invention.

The flow divider valve 11 includes a housing 21 which defines an inlet 23 receiving fluid from the pump 13, as well as a priority outlet 25 communicating with conduit 15 and an excess flow outlet 27 communicating with conduit 17. The housing 21 further defines a main valve bore 29 which, preferably, has the same diameter over its entire, unthreaded length for ease of assembly. Slidably disposed within the main valve bore 29 is a valve spool 31 (also shown in FIG. 2), illustrated as having a plurality of annular lands 33, 35, 37 and 39.

At the left end of the main valve bore 29 is a threaded plug 41 trapping an oil seal 43 within an annular recess defined by the housing 21. Similarly, at the right end of the valve bore 29 is a threaded plug 45 trapping an oil seal 47 within a recess defined by the housing 21.

The spool land 39 defines an enlarged, generally cylindrical bore 51 within which is seated one end of a helical spring 53, the other end of the spring 53 being seated within a spring seat 55 defined by the threaded plug 45. Valve spool 31 also defines a blind axial bore 57 which empties into the enlarged bore 51.

Fluid entering the valve 11 through the inlet 23 flows into an inlet chamber 61 which is in open, fluid communication with the main valve bore 29. In the valve condition illustrated in FIG. 1, pressurized fluid in inlet chamber 61 is able to flow into axial bore 57 through a primary set of apertures 63 and a secondary set of apertures 65, the primary and secondary apertures 63 and 65 being fluidicly in parallel. Fluid from the axial bore 57 passes through the enlarged bore 51 and into a priority chamber 67, from which it flows through the priority outlet 25 into the conduit 15.

In the valve condition shown in FIG. 1, some of the fluid in inlet chamber 61 is able to flow past spool land 35 and into an excess flow chamber 71, from which the fluid passes through the excess flow outlet 27 and into conduit 17. At the left end of the valve spool 31, the spool land 33 and the threaded plug 41 cooperate to define a chamber 73 which communicates the inlet chamber 61 through a passage 75, the function of which will be described subsequently.

FIRST CONDITION — PRIORITY DEVICE

Referring still to FIG. 1, in which the flow divider valve 11 is in a first condition with the power steering system operative, the valve spool 31 is biased to the position shown by the force of biasing spring 53 and the pressurized fluid in priority chamber 67. In this condition, fluid flows freely from the inlet chamber 61 through the primary and secondary apertures 63 and 65, through the axial bore 57, the enlarged bore 51 and into the priority chamber 67. As mentioned previously, the remainder of the flow is past the spool land 35 and through a metering orifice 77 defined by spool land 37 and a corner at the adjacent portion of the main valve bore 29 which forms a sealing surface 81. The function of sealing surface 81 will be described subsequently.

Assuming a constant flow of fluid into the flow divider valve 11, the operation of the metering orifice 77 to maintain a constant flow rate into the excess flow chamber 77 insures a constant flow rate to the priority chamber 67. In the first condition therefore, the excess flow is metered by the valve spool while the priority flow is relatively unrestricted.

When the valve spool 31 is in the first condition shown in FIG. 1, variations in the fluid pressure differential across the spool cause it to move through relatively small displacements to maintain a substantially constant predetermined operating flow rate to the priority device. Thus, if the fluid pressure at the priority outlet 25 should increase, there is a slight, momentary reduction in the pressure drop across the primary and secondary apertures 63 and 65 and a corresponding instantaneous drop in the flow rate to the priority chamber 67. This instantaneous drop in the flow rate is immediately corrected by a slight shifting of the valve spool 31 toward the left as viewed in FIG. 1. The leftward movement of the valve spool 31 decreases the fluid flow to the excess flow chamber 71 and returns the flow rate to the priority chamber 67 to the desired flow rate.

If the fluid pressure in the priority chamber 67 should happen to decrease slightly when the valve spool 31 is in the first condition of FIG. 1, the fluid pressure differential across the sets of apertures 63 and 65 is instantaneously increased. This results in an instantaneous increase in the rate of fluid flow to the priority chamber 67. However, the valve spool 31 is quickly moved through a small displacement to compensate for the slight increase in fluid pressure at the inlet chamber 61 to maintain a substantially constant fluid flow rate to the priority device. The slight momentary decrease in fluid pressure at the priority chamber 67 causes the valve spool 31 to move slightly toward the right against the biasing force of the spring 53 and the fluid pressure in chamber 67. As the valve spool 31 moves through a small displacement toward the right, the spool land 37 moves away from the adjacent portion of the main valve bore 29 to slightly increase the rate of flow to the excess flow chamber 71. This results in a reduction in the fluid pressure in the inlet chamber 61 which, in turn, causes a decrease in the fluid pressure differential across the sets of apertures 63 and 65 and a resulting correction of the instantaneous increase in the flow rate to the priority chamber 67. Thus, the valve spool 31 oscillates or modulates through relatively small displacements when it is in the first condition of FIG. 1 to maintain a substantially constant flow rate to the priority chamber 67 and to the excess flow chamber 71.

SECOND CONDITION — AUXILIARY MECHANISM

Figure 3:
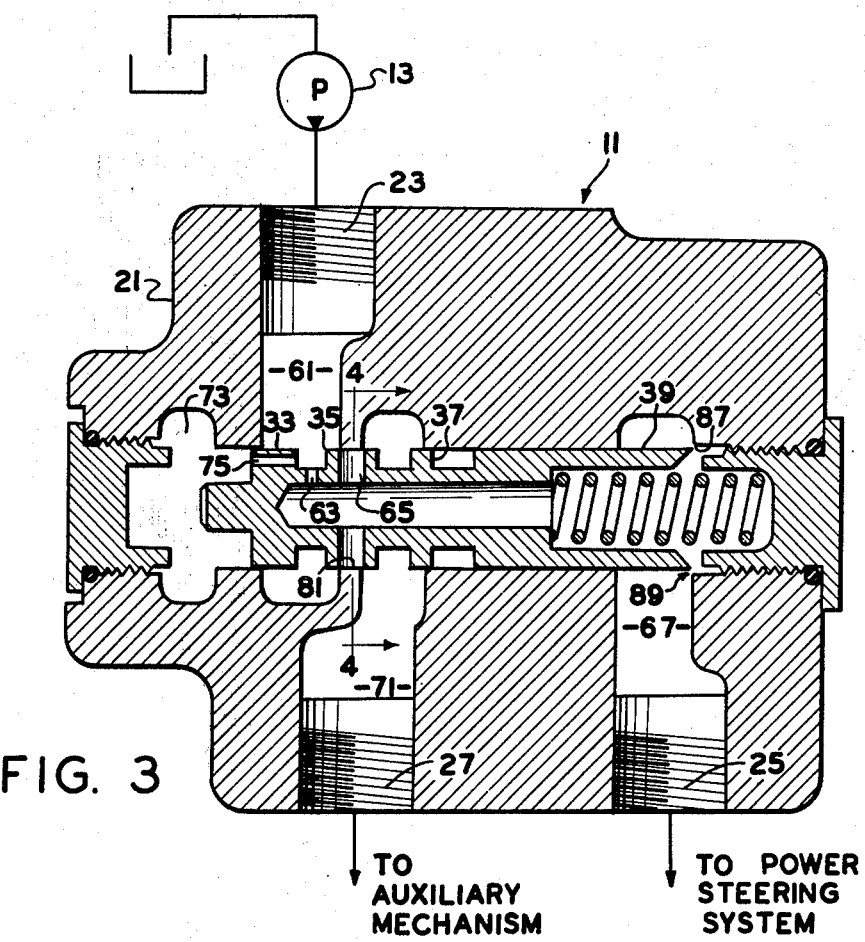
FIG. 3 is an illustration similar to FIG. 1, but with the valve spool in a different operating position.

When the priority device, such as the power steering system, is not being operated and the auxiliary mechanism is activated, the valve spool 31 is shifted from the position shown in FIG. 1 to the position shown in FIG. 3. This occurs because the pressure in the priority chamber 67 tending to bias the valve spool 31 to the left is decreased, while the pressure in the excess flow chamber 71 is increased and the pressure in chamber 73, communicating with the inlet chamber 61 through the passage 75, acts on the cross-sectional area of the valve spool 31, biasing it toward the right. With the valve spool 31 in the position shown in FIG. 3, the primary set of apertures 63 communicates between the inlet chamber 61 and the axial bore 57, but the secondary set of apertures 65 is in sealing engagement with the sealing surface 81 thereby preventing the flow of fluid from inlet chamber 61 through the set of apertures 65 to the axial bore 57. In this second condition therefore, the only fluid flowing to the axial bore 57 for eventual transmission to the priority device is that passing through the primary set of apertures 63 which, preferably, provides a substantially smaller flow area than the secondary set of apertures 65.

Figure 4:
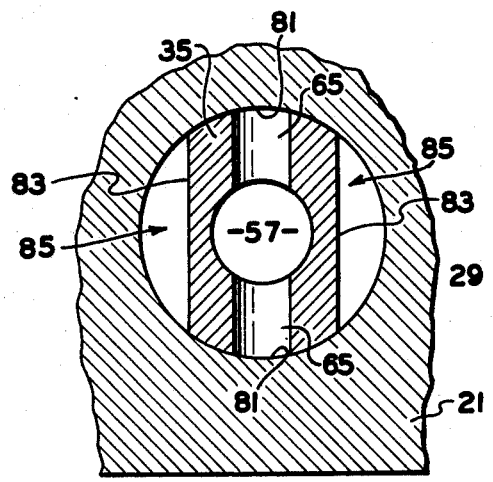
FIG. 4 is an enlarged, fragmentary cross-section view taken on line 4—4 of FIG. 3.

Referring now to the FIG. 4, in conjunction with FIG. 3, it may be seen that with the valve spool 31 in the second condition, the annular spool land 35 is disposed within the main valve bore 29 to block fluid communication between the inlet chamber 61 and the excess flow chamber 71. However, because in the second condition the majority of the fluid flow is required by the auxiliary mechanism, the spool land 35, rather than being annular, is provided with a pair of flat surfaces 83 which cooperates with the main valve bore 29 to define a pair of axial auxiliary flow passages 85 which permit fluid flow from the inlet chamber 61 to the excess flow chamber 71. The flow area of the passages 85 should be large enough to offer no substantial restriction to the desired flow rate therethrough, and the predetermined, desired flow rate to the auxiliary mechanism in the second condition is maintained substantially constant in the manner described below.

With the valve spool 31 in the position shown in FIG. 3 the flow rate to the auxiliary mechanism is controlled indirectly by metering the flow to the priority device. In FIG. 3, it may be seen that the main valve bore 29 and the priority chamber 67, at their intersection, define a corner or land 87. This corner 87 cooperates with the adjacent end of the valve spool 31 to define a metering orifice 89 through which fluid must flow to pass from the axial bore 57 to the priority chamber 67. The metering orifice 89 is effective to restrict and meter fluid flowing to the priority chamber 67 because the flow area of the metering orifice 89 is less than the combined flow area of the primary apertures 63, and the portion of the main valve bore 29 which defines the corner 87 may have a smaller diameter than the remainder of the bore 29 so that, in the second condition, the end of the valve spool 31 may abut the corner 87 to completely shut off fluid flow to the priority chamber 67, thus providing a zero controlled flow. It should be noted that although in FIGS. 1 and 3, only one aperture 63 is shown there may be more than one, although preferably not more than four, and if more than one is utilized, they should be uniformly spaced, circumferentially, to minimize flow forces acting on the spool 31.

If the fluid pressure in the excess flow chamber 71 should increase when the valve spool 31 is in the second condition shown in FIG. 3, the increased fluid pressure is transmitted through the passages 85 and causes an increase in the fluid pressure differential across the primary set of apertures 63 and the metering orifice 89. The result is an instantaneous increase in the rate of fluid flow to the priority chamber 67. The increase in fluid pressure in the excess flow chamber 71 is also transmitted through the passage 75 to the chamber 73, and the increase in pressure in the chamber 73 causes the valve spool 31 to shift toward the right. This slight shifting rightward of the valve spool 31 causes the metering orifice 89 to be reduced, thus reducing the flow rate to the priority chamber 67, thus compensating for the momentary increase in the flow rate to chamber 67.

If the fluid pressure in the excess flow chamber 71 should decrease slightly when the spool 31 is in the second condition, thereby decreasing pressure in chamber 73, the spool 31 is shifted slightly toward the left to increase the size of the metering orifice 89 and maintain the predetermined minimum flow rate to the priority chamber 67. Thus, the flow rate from the inlet chamber 61 to the priority chamber 67 is quickly returned to the predetermined minimum flow rate, and the valve spool 31 continuously oscillates or modulates to maintain this predetermined flow rate even though the fluid pressure in the excess flow chamber 71 may vary slightly. It should be noted that the passage 75 has a relatively restricted flow area so that it acts as a dashpot to dampen movement of the spool 31 in response to transient variations in fluid pressure in the chambers 71 and 67.

Thus, the valve spool 31 is shiftable between a first condition (FIG. 1), and a second condition (FIG. 2), to select between two different fluid flow rates to the priority device. In both conditions, the flow of fluid is modulated or controlled to maintain the flow rate to the priority device substantially constant at the particular predetermined flow rate, and when each of the flow rates is at the predetermined level, all pressure forces acting on the valve spool 31 are equal.

The invention has been described in detail sufficient to enable one of ordinary skill in the art to make and use the same. Modifications and alterations of the preferred embodiment will occur to others upon a reading of the specification and it is my intention to include all such modifications and alterations insofar as they come within the scope of the appended claims.

I claim:
1. A valve assembly comprising:
    a. a valve body defining an inlet port to be connected to a source of fluid under pressure, a priority flow outlet port, an excess flow outlet port and a main valve bore interconnecting said ports;
    b. a valve spool movable within said valve bore between a first condition restricting flow to said excess flow outlet port and a second condition restricting flow to said priority flow outlet port;
    c. first aperture means defined by said valve spool for porting fluid flow from said inlet port to said priority flow outlet port when said valve spool is in said first and second conditions;
    d. second aperture means defined by said valve spool, axially disposed from said first aperture means, said second aperture means porting fluid flow from said inlet port to said priority flow outlet port when said valve spool is in said first condition;
    e. said main valve bore defining a sealing surface disposed fluidicly between said inlet port and said excess flow outlet port, said sealing surface preventing substantial fluid communication between said inlet port and said second aperture means when said valve spool is in said second condition; and
    f. means for moving said valve spool between said first and second conditions in response to the fluid pressure differential between said priority flow outlet port and said excess flow outlet port.

2. A valve assembly as defined in claim 1 wherein said valve spool defines passage means providing fluid communication between said inlet port and said excess fluid outlet port when said valve spool is in said second condition with said sealing surface sealing said second aperture means.

3. A valve assembly as defined in claim 1 wherein said valve spool and said main valve bore cooperate to define a variable metering orifice, when said valve spool is in said first condition, to meter fluid flow from said inlet port to said excess flow outlet port in response to the pressure drop across said metering orifice.

4. A valve assembly comprising:
 a. a valve body defining an inlet port to be connected to a source of fluid under pressure, a priority flow outlet port, an excess flow outlet port, and a main valve bore interconnecting said ports;
 b. a valve spool axially movable within said main valve bore, said valve spool defining an axial bore having one end thereof in fluid communication with said priority flow outlet port;
 c. said valve spool defining first aperture means oppositely disposed from said one end of said valve spool, said first aperture communicating between said inlet port and said axial bore, said valve spool further defining a spool land defining second aperture means communicating between said inlet port and said axial bore when said valve spool is in a first condition;
 d. said main valve bore defining a sealing surface disposed fluidicly between said inlet port and said excess flow outlet port, said spool land being axially aligned with said sealing surface, said sealing surface substantially preventing fluid communication between said inlet port and said second aperture means when said valve spool is in a second condition;
 e. said valve spool being biased in one direction toward said first condition by fluid pressure in said priority flow outlet port and by spring means, and in the other direction toward said second condition by fluid pressure in said excess flow outlet port;
 f. said valve spool including means for metering fluid flow from said inlet port to said excess fluid outlet port when said valve spool is in said first condition; and
 g. said valve spool and said main valve bore, adjacent said one end of said valve spool, cooperating to define a variable metering orifice to meter fluid flow from said inlet port to said priority flow outlet port when said valve spool is in said second condition.

5. A valve assembly as defined in claim 4 wherein said spool land defines passage means communicating between said inlet port and said excess fluid outlet port when said valve spool is in said second condition.

6. A valve assembly as defined in claim 5 wherein said passage means comprises said spool land including at least a pair of flats.

7. A valve assembly as defined in claim 4 wherein said first aperture means comprises a plurality of bores, uniformly spaced apart circumferentially and extending radially outwardly from said axial bore.

8. A valve assembly as defined in claim 7 wherein said plurality of bores is defined by a portion of said valve spool having an outside diameter substantially less than the diameter of said main valve bore.

9. A valve assembly as defined in claim 4 wherein said second aperture means provides a greater flow area than said first aperture means.

10. A valve assembly as defined in claim 4 wherein said first aperture means provides a greater flow area than said variable metering orifice.

* * * * *